(12) United States Patent
Li et al.

(10) Patent No.: US 11,830,112 B2
(45) Date of Patent: Nov. 28, 2023

(54) METHOD FOR RAPID RECONSTRUCTION OF WOVEN COMPOSITE MATERIAL MICROSTRUCTURE BASED ON TOPOLOGICAL FEATURES

(71) Applicants: SHAOXING RESEARCH INSTITUTE OF SHANGHAI UNIVERSITY, Zhejiang (CN); SHANGHAI UNIVERSITY, Shanghai (CN)

(72) Inventors: Aijun Li, Zhejiang (CN); Dan Zhang, Zhejiang (CN); Jingchao Yuan, Zhejiang (CN); Meihua Shi, Zhejiang (CN)

(73) Assignees: SHAOXING RESEARCH INSTITUTE OF SHANGHAI UNIVERSITY, Zhejiang (CN); SHANGHAI UNIVERSITY, Shanghai (CN)

( * ) Notice: Subject to any disclaimer, the term of this patent is extended or adjusted under 35 U.S.C. 154(b) by 225 days.

(21) Appl. No.: 17/291,730

(22) PCT Filed: Jun. 4, 2020

(86) PCT No.: PCT/CN2020/094434
§ 371 (c)(1),
(2) Date: May 6, 2021

(87) PCT Pub. No.: WO2020/244593
PCT Pub. Date: Dec. 10, 2020

(65) Prior Publication Data
US 2022/0130082 A1    Apr. 28, 2022

(30) Foreign Application Priority Data
Jun. 5, 2019    (CN) .................... 201910487897.8

(51) Int. Cl.
*G06T 7/00*    (2017.01)
*G06T 11/00*    (2006.01)

(52) U.S. Cl.
CPC .. *G06T 11/006* (2013.01); *G06T 2207/10081* (2013.01); *G06T 2211/416* (2013.01)

(58) Field of Classification Search
CPC ............. F01D 5/282; F05D 2300/6034; G06T 2207/10081; G06T 7/40; G06T 7/0004;
(Continued)

(56) References Cited
U.S. PATENT DOCUMENTS
9,916,651 B2 *    3/2018 Morard .................... F01D 5/282

FOREIGN PATENT DOCUMENTS
CN    102236737 A    11/2011
CN    104268940 A    1/2015
(Continued)

OTHER PUBLICATIONS
International Search Report of International Searching Authority for PCT/CN2020/094434, ISA/CN, Beijing, China, dated Aug. 17, 2020.
(Continued)

*Primary Examiner* — Don K Wong
(74) *Attorney, Agent, or Firm* — M&B IP Analysts, LLC.

(57) ABSTRACT

A method for rapid reconstruction of a woven composite material microstructure based on topological features is provided. First, geometric modeling is performed according to the topological features of fiber bundles and matrix in a woven composite structure, then the topological features are identified on the basis of a µ-computed tomography (CT) sequence image, the change laws of the features are extracted, and finally, a geometric model is reconstructed to complete the modeling of a microstructure. Compared with the structure modeling method based on weaving process parameters, the consistency between the reconstructed model and a real woven structure is improved, facilitating the improvement of the accuracy of the subsequent calcu-
(Continued)

lation of the mechanical properties of the material; and compared with the method for structure reconstruction directly on the basis of a μCT image, a tedious point cloud data process is simplified and calculation costs are greatly reduced.

4 Claims, 5 Drawing Sheets

(58) Field of Classification Search
CPC .............. G06T 7/001; G01N 229/0289; G01N 23/046; G01N 2223/615; G01N 29/0645; G01N 2291/023
See application file for complete search history.

(56) References Cited

FOREIGN PATENT DOCUMENTS

| | | | |
|---|---|---|---|
| CN | 105803623 | A | 7/2016 |
| CN | 106202728 | A | 12/2016 |
| CN | 108932385 | A | 12/2018 |
| CN | 110276814 | A | 9/2019 |
| CN | 109241694 | B | 4/2021 |
| EP | 3425539 | A1 | 1/2019 |

OTHER PUBLICATIONS

Written Opinion of International Searching Authority for PCT/CN2020/094434, ISA/CN, Beijing, China dated Aug. 17, 2020.

\* cited by examiner

FIG. 2-3

METHOD FOR RAPID RECONSTRUCTION OF WOVEN COMPOSITE MATERIAL MICROSTRUCTURE BASED ON TOPOLOGICAL FEATURES

CROSS-REFERENCE TO RELATED APPLICATIONS

This application claims priority under 35 U.S.C. 371 to the International Application No.: PCT/CN2020/094434, filed Jun. 4, 2020, and to the Chinese Patent Application No.: 201910487897.8, filed Jun. 5, 2019, the contents of which are hereby incorporated by reference.

TECHNICAL FIELD

The present disclosure relates to the field of structural reconstruction, in particular to a method for rapid reconstruction of a woven composite material microstructure based on topological features.

BACKGROUND

Three-dimensional woven composite material is a kind of composite material which weaves warp, weft and normal fiber bundles into a whole by using weaving technology and has the characteristics of material and structure integration. Because the damage caused by secondary processing is avoided, it not only has good physical and chemical characteristics such as high specific strength and specific stiffness of traditional composite materials, but also avoids the interlayer shear failure of traditional laminates of composite materials, which greatly improves the reliability of materials and reduces the cost. Therefore, three-dimensional woven composite materials have broad development prospects and are the mainstream materials for future aerospace development.

With the development of computer industry, in the field of mechanical properties of composite materials, numerical simulation technology has kept pace with traditional mechanical experiment technology, and has become two main methods to study problems. The geometric modeling of material microstructure is the most basic part of numerical simulation technology, which directly affects the accuracy of numerical calculation results. At present, most geometric models are modeled for idealized structures, without considering the deformation caused by mutual restraint between fiber bundles and between fiber bundles and matrix in actual woven structures. This makes the calculation model of the microstructure of materials quite different from the real situation, which leads to great errors in predicting the mechanical properties of some materials, such as crack propagation and material damage. However, if the detailed microstructure modeling is carried out completely according to the real materials, on the one hand, the calculation cost will increase greatly, and on the other hand, the numerical calculation method may be difficult to converge due to some small size defects, so that the prediction of mechanical properties fails.

There are three kinds of microscopic modeling methods for composite woven materials. 1) One method is to cut the actual woven piece, shoot the cut surface, obtain the actual fiber bundle cross-sectional profile using image processing technology, and then reconstruct the geometric model by CAD software. However, cutting will inevitably cause damage to the woven body. 2) A second method is to use the weaving parameters and the weaving law of fiber bundles to carry out the geometric model of an idealized model without considering the bending and cross-section deformation of fiber bundles caused by the mutual kinking and extrusion of space fiber bundles. However, there is no practical basis, and the influence of the interaction between fiber bundles on the cross-sectional shape and structure of fiber bundles in the actual weaving process is not taken into account. 3) A third method is to directly generate point cloud data based on tomographic images. According to the data reconstruction model, this modeling method is often cumbersome and easy to introduce errors.

With the Application NO. 201410550663.0, and entitled as "MEMS STRUCTURE RECONSTRUCTION AND DETECTION METHOD BASED ON CT SCANNING IMAGE", the present disclosure uses industrial CT technology to scan and obtain series images of the device, processes the images to obtain point cloud volume data, reconstructs the surface model according to the volume data, and then reconstructs the solid model according to the surface model. This method focuses on the feature identification of surface shape, and is applied to nondestructive detection of MEMS ultra-small structures. With the Application NO. 201110194159.8, and entitled as "FINITE ELEMENT RECONSTRUCTION METHOD OF MULTIPHASE MATERIAL MICROSTRUCTURE STRUCTURE BASED ON SEQUENCE IMAGES", on the basis of collecting, reading and interpolating sequence images of materials, the present disclosure establishes a mesh model which forms a mapping relationship with the images, determines node and unit information by using the construction information of the mesh, and determines model material attributes by using image color information, thus reconstructing the finite element model. This method avoids the accumulation of errors in geometric reconstruction and mesh division, but it needs to deal with a large amount of data and has high calculation cost. This method is more suitable for dealing with multiphase randomly distributed materials. With the Application NO. 201610240707.9 and entitled as "COMPUTER GRAPHIC IDENTIFICATION METHOD OF COMPOSITE MATERIAL MICROSTRUCTURE", the present disclosure adopts X-ray computed tomography technology to obtain pictures of a 2.5-dimensional composite material microstructure. The matrix region is identified by threshold segmentation technology. Each matrix area is assumed to be a twisted quadrilateral structure, and four boundaries of each matrix area are identified and marked. The matrix area is used to identify the warp fiber bundles and weft fiber bundles of the preform. Finally, each identified picture is stacked to build a 2.5-dimensional microstructure three-dimensional model. The application scope of this method is relatively narrow, and it is not feasible for complex 3D orthogonal and 3D 4-directional weaving structures. Moreover, the identified main body is the matrix without taking into account the weaving characteristics of the woven structure fiber bundles, and it is easy to cause model errors.

SUMMARY

The purpose of the present disclosure is to provide a method for rapid reconstruction of a woven composite material microstructure based on topological features, so as to improve the consistency between the model and the real structure.

To achieve the above purpose, the present disclosure provides the following scheme.

The present disclosure provides a method for rapid reconstruction of a woven composite material microstructure based on topological features, comprising the steps of:
1) preparing a sample: preparing composite material samples with dimensions suitable for μCT test;
2) parametric modeling of the microstructure of a woven body: it is assumed that the weaving process is stable and the woven structure is uniform; the cross section of a fiber bundle is approximate to an ellipse, and spline curve is used as the axis of the fiber bundle to represent the trend of the fiber bundle, wherein parametric modeling is carried out for structures with different weaving methods to establish the topological model of a woven body;
3) scanning using a μCT system: scanning the composite material sample with a high-power microscopic μCT system to obtain the point cloud data of the composite material sample;
4) data processing: using ImageJ image processing software to process the raw data scanned by the μCT system, and converting the raw file into a common png graphic file; wherein the raw data is the point cloud data in step 3;
5) identification of phase components of the microstructure: different substances have different X-ray absorption coefficients, areas with composite materials and areas without composite materials show different gray scales in μCT scanning images, and various isotropic fiber bundles of the woven structure are identified according to the discontinuity of gray scales;
6) identification and extraction of the features of the fiber bundles of the microstructure: using the measuring tool in ImageJ software to obtain the characteristic parameters and structure parameters of the distance between bundles and the actual cross-section shape of fiber bundles at different spatial positions of the processed raw data, and then using the statistical average processing method to homogenize the change law of the measured parameters;
7) modification of a parametric model: according to the extracted characteristic parameters, modifying the spatial position of fiber bundles in the parametric microscopic model, and modifying the cross-sectional parameters of fiber bundles along the fiber bundle direction, so as to show the degree of deformation of fiber bundles under extrusion, in which at different positions, the fiber bundles have different degrees of deformation, thus obtaining a microscopic model with a high degree of consistency with the real structure.

Preferably, the μCT system is a CT system with other scanning accuracy.

Preferably, raw data scanned by the μCT system is processed by VGStudio or Avizo software to convert raw files into commonly used png graphics files.

Preferably, the microstructure model is a microscopic model or a topological model.

Compared with the prior art, the method has the following technical effects. 1) The model is highly consistent with the real structure; the present disclosure extracts the real characteristic parameters of the material by using CT tomography without damaging the material structure; and compared with the idealized model obtained by cutting the woven body to obtain material parameters or established by only using the weaving parameters, the reconstructed model of the present disclosure is more consistent with the real structure.

2) The model reconstruction process is simple and fast, and the calculation cost is low: the present disclosure does not directly use the point cloud data of CT scanning sequence images to generate the model, but only extracts important woven body characteristic parameters, and the extraction method is simple and clear. Compared with directly generating the model by using the point cloud data, the present disclosure omits the complicated data processing process which is easy to introduce errors, and greatly reduces the calculation cost.

3) Wide application range: the present disclosure can be applied to the microscopic model reconstruction of composite materials with any known woven structure, and for composite materials with the same woven structure, only model parameters need to be changed according to characteristic parameters, and repeated modeling is not needed.

BRIEF DESCRIPTION OF THE DRAWINGS

The present disclosure will be further explained with reference to the accompanying drawings.

FIG. 2-1 is μCT scanning result and a reconstructed microscopic model of a 2D woven body according to an embodiment of the present disclosure;

FIG. 2-2 is μCT scanning result and a reconstructed microscopic model of a 2.5D woven body according to an embodiment of the present disclosure;

FIG. 2-3 is μCT scanning result and a reconstructed microscopic model of a 3D orthogonal woven body according to an embodiment of the present disclosure;

FIG. 2-4 is μCT scanning result and a reconstructed microscopic model of a 3D 4-directional woven body according to an embodiment of the present disclosure;

DETAILED DESCRIPTION

Figure 1:
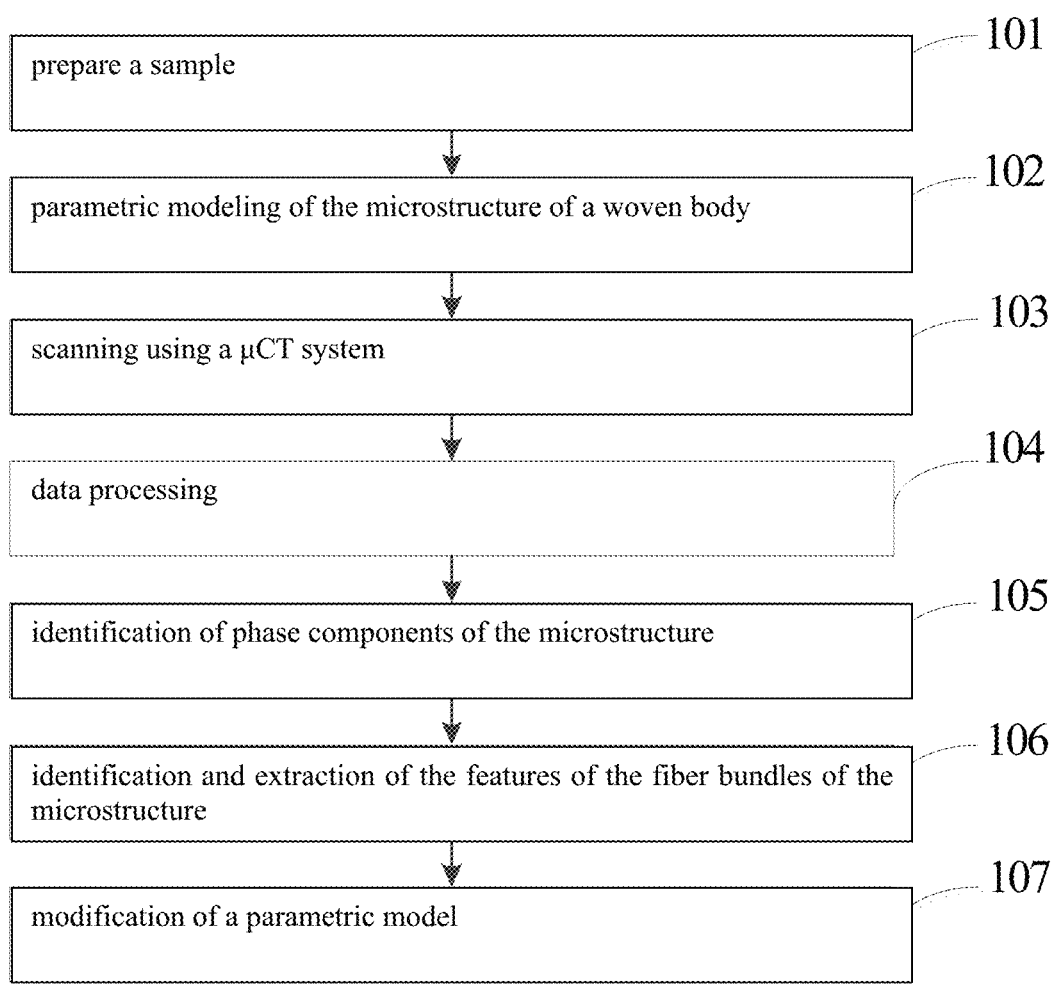
FIG. 1 is a modeling flow chart of the present disclosure.
Figures 1, 2:
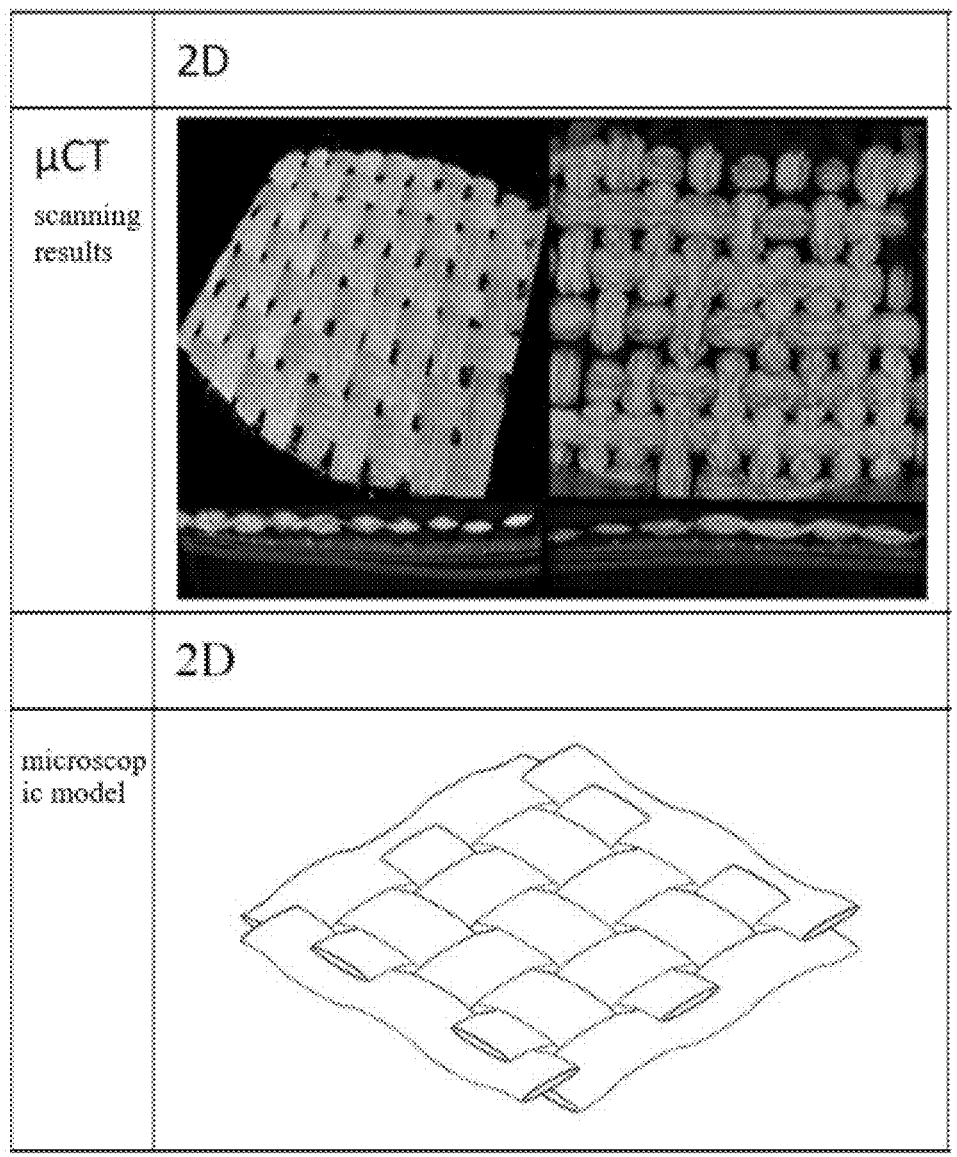
Figure 2:
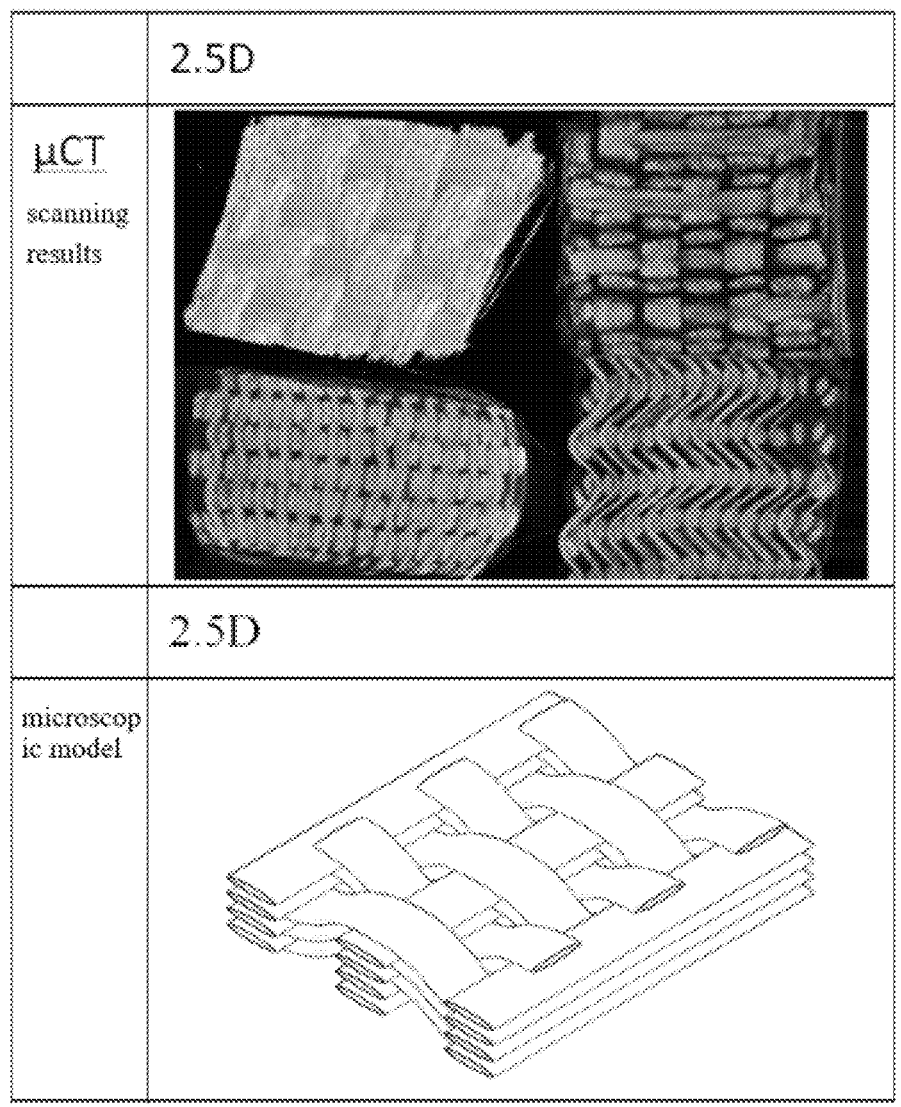
Figures 2, 3, 4:
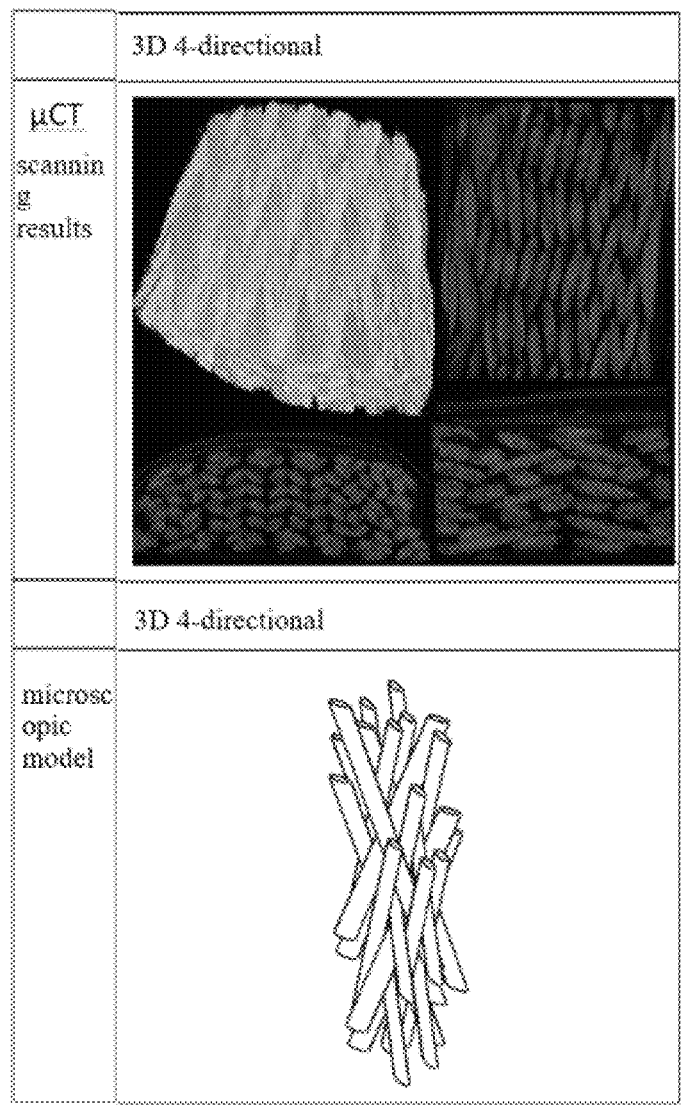

As shown in FIG. 1, a method for rapid reconstruction of a woven composite material microstructure based on topological features according to the present disclosure takes the 2.5D woven structure shown in FIG. 2-2 as an example, comprising the following steps.

Step 101: preparing a sample: 2.5D composite material samples with dimensions (length×height×width: 8750.76×4304.5×11670 μm) suitable for μCT test are prepared.

Step 102: parametric modeling of the microstructure of a woven body: 2D structure is formed by warp fiber bundles and weft fiber bundles interwoven in the same plane, 2.5D structure is based on 2D, which interweaves weft fiber bundles with two layers of warp fiber bundles to form parallel multi-layer interweaving, taking ellipse as the fiber bundle cross section of 2.5D model, carrying out parametric modeling according to interweaving mode of warp fiber bundles and weft fiber bundles, and establishing topological model of a woven body.

Step 103: scanning using a μCT system: the real 2.5D woven body with the same braiding parameters is scanned with a high-power microscopic μCT system to obtain the point cloud data of a woven body structure.

Step 104: Data processing: ImageJ image processing software is used to process the raw data scanned by the μCT system, and the raw file is converted into a common png graphic file.

Step 105: identification of phase components of the microstructure: different substances have different X-ray absorption coefficients, areas with materials and areas without materials show different gray scales in μCT scanning images, and warp fiber bundles and weft fiber bundles with 2.5D woven structure are identified according to the discontinuity of gray scales.

Step 106: identification and extraction of the features of the fiber bundles of the microstructure: the measuring tool in ImageJ software is used to obtain the characteristic parameters and structure parameters of the distance between bundles and the actual cross-section shape of fiber bundles at different spatial positions, and then the statistical average processing method is used to homogenize the actually measured features and structure parameters. Under the influence of the weaving method, the weft fiber bundles are closely arranged, and the warp fiber bundles are squeezed by the weft fiber bundles everywhere. From the actually measured data of μCT scan images, it is known that the cross-sectional area of fiber bundles along the axial direction changes little and is ignorable. The cross-sectional area of warp fiber bundles is homogenized. The major axis of the elliptical cross-section is 1076 μm and the minor axis is 142.5 μm. The distance between warp fiber bundles is 2381 μm. The warp fiber bundles are loosely arranged and the distance between bundles is large, so that some weft fiber bundles are not in contact with the warp fiber bundles. From the actually measured data of μCT scanning images, it is known that the cross-sectional areas of the contacting part and the non-contacting part of the two fiber bundles change greatly and is non-ignorable. After homogenization, the maximum cross-sectional area at the center of the uncrossed part of two fiber bundles is 169,936 μm2, the major axis of the elliptical cross-section is 988 μm, the minor axis is 172 μm, the minimum cross-sectional area at the center of the crossed part of two fiber bundles is 157,573 μm2, the major axis of ellipse is 1105 μm, the minor axis is 142.6 μm, and the distance between weft fiber bundles is 1120 μm.

Step 107: modification of a parametric model: according to the extracted characteristic parameters, the distance between bundles and the cross-sectional parameters of the warp fiber bundles and weft fiber bundles in the parametric microscopic model are modified to obtain a microscopic model with a high degree of consistency with the real structure.

The μCT system can use a CT system with other scanning accuracy. The raw data obtained by μCT scanning can be processed by VGStudio and Avizo software, which can obtain the same effect as ImageJ software. The microstructure model can be replaced by the concepts of a microscopic model and a topological model.

As shown in FIGS. 2-1, 2-3 and 2-4, they are μCT scanning results and reconstructed microscopic models of 2D, 3D orthogonal and 3D 4-directional woven bodies according to the present disclosure, respectively.

In the present disclosure a specific example is applied to illustrate the principle and implementation of the present disclosure. The explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed:

1. A method for rapid reconstruction of a woven composite material microstructure based on topological features, comprising the steps of:
    1) preparing a sample: preparing composite material samples with dimensions suitable for μCT test;
    2) parametric modeling of the microstructure of a woven body: it is assumed that the weaving process is stable and the woven structure is uniform; the cross section of a fiber bundle is approximate to an ellipse, and spline curve is used as the axis of the fiber bundle to represent the trend of the fiber bundle, wherein parametric modeling is carried out for structures with different weaving methods to establish the topological model of a woven body;
    3) scanning using a μCT system: scanning the composite material sample with a high-power microscopic μCT system to obtain the point cloud data of the composite material sample;
    4) data processing: using ImageJ image processing software to process the raw data scanned by the μCT system, and converting the raw file into a common png graphic file; wherein the raw data is the point cloud data in step 3;
    5) identification of phase components of the microstructure: different substances have different X-ray absorption coefficients, areas with composite materials and areas without composite materials show different gray scales in μCT scanning images, and various isotropic fiber bundles of the woven structure are identified according to the discontinuity of gray scales;
    6) identification and extraction of the features of the fiber bundles of the microstructure: using the measuring tool in ImageJ software to obtain the characteristic parameters and structure parameters of the distance between bundles and the actual cross-section shape of fiber bundles at different spatial positions of the processed raw data, and then using the statistical average processing method to homogenize the change law of the measured parameters;
    7) modification of a parametric model: according to the extracted characteristic parameters, modifying the spatial position of fiber bundles in the parametric microscopic model, and modifying the cross-sectional parameters of fiber bundles along the fiber bundle direction, so as to show the degree of deformation of fiber bundles under extrusion, in which at different positions, the fiber bundles have different degrees of deformation, thus obtaining a microscopic model with a high degree of consistency with the real structure.

2. The method according to claim 1, wherein the μCT system is a CT system with arbitrary scanning accuracy.

3. The method according to claim 1, wherein raw data scanned by the μCT system is processed by VGStudio or Avizo software to convert raw files into commonly used png graphics files.

4. The method according to claim 1, wherein the microstructure model is a microscopic model or a topological model.

* * * * *